US011229959B2

(12) United States Patent
Misumi et al.

(10) Patent No.: US 11,229,959 B2
(45) Date of Patent: Jan. 25, 2022

(54) DRILL

(71) Applicant: Sumitomo Electric Hardmetal Corp., Itami (JP)

(72) Inventors: Shuhei Misumi, Itami (JP); Minoru Yoshida, Itami (JP); Yoshiji Sato, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 129 days.

(21) Appl. No.: 16/473,397

(22) PCT Filed: Aug. 7, 2018

(86) PCT No.: PCT/JP2018/029595
§ 371 (c)(1),
(2) Date: Jun. 25, 2019

(87) PCT Pub. No.: WO2020/031259
PCT Pub. Date: Feb. 13, 2020

(65) Prior Publication Data
US 2020/0406375 A1    Dec. 31, 2020

(51) Int. Cl.
*B23B 51/10*    (2006.01)
*B23B 51/02*    (2006.01)

(52) U.S. Cl.
CPC ............ *B23B 51/108* (2013.01); *B23B 51/02* (2013.01); *B23B 2251/04* (2013.01); *B23B 2251/18* (2013.01)

(58) Field of Classification Search
CPC ....... B23B 51/02; B23B 51/06; B23B 51/009; B23B 51/108; B23B 2251/04; B23B 2251/043; B23B 2251/08; B23B 2251/12; B23B 2251/127; B23B 2251/18; B23B 2251/241; B23B 2251/244; B23B 2251/285; B23B 2251/40; B23B 2251/426; B23B 2251/44; B23B 2251/48
See application file for complete search history.

(56) References Cited

U.S. PATENT DOCUMENTS 750,537 A * 1/1904 Hanson .................. B23B 51/02
                                                                    408/230
867,639 A * 10/1907 Bragg .................. B23B 51/048
                                                                    408/223
1,000,067 A    8/1911 Bennett
(Continued)

FOREIGN PATENT DOCUMENTS

DE        4231381 A1 *    3/1994    ......... B23B 51/0493
JP        S55-011897 U    1/1980
(Continued)

*Primary Examiner* — Eric A. Gates
(74) *Attorney, Agent, or Firm* — Baker Botts L.L.P.; Michael A. Sartori

(57)    ABSTRACT

A drill includes a body. The body includes a first cutting edge, and a second cutting edge apart from the first cutting edge to the back end side relative to the first cutting edge and formed in a recess traversing an outer peripheral portion of the body. In a side view of the body in a first direction in which a distance between a center axis of the body and a first outer end of the first cutting edge is seen the longest, a second outer end of the second cutting edge is located at the center axis side relative to the first outer end of the first cutting edge.

8 Claims, 7 Drawing Sheets

(56) References Cited

U.S. PATENT DOCUMENTS

| | | | | |
|---|---|---|---|---|
| 1,384,733 | A * | 7/1921 | Woods | B23B 51/02 408/56 |
| 2,322,894 | A * | 6/1943 | Stevens | B23B 51/02 408/230 |
| 2,332,295 | A * | 10/1943 | Bouchal | B27G 15/00 408/211 |
| 2,646,701 | A * | 7/1953 | Letien | B23B 51/02 408/56 |
| 3,667,857 | A * | 6/1972 | Shaner et al. | B23B 51/08 408/230 |
| 3,786,713 | A * | 1/1974 | Sygnator | F16B 25/103 411/387.7 |
| 3,913,196 | A * | 10/1975 | Maday | B23B 51/08 407/54 |
| 5,160,232 | A * | 11/1992 | Maier | B23B 51/02 407/54 |
| 6,126,367 | A * | 10/2000 | Reed | B23B 51/02 408/1 R |
| 7,575,401 | B1 * | 8/2009 | Garrick | B23B 51/02 408/145 |
| 7,665,935 | B1 * | 2/2010 | Garrick | B23B 35/005 408/227 |
| 8,714,890 | B2 | 5/2014 | Davancens et al. | |
| 9,308,589 | B2 * | 4/2016 | Oka | B23B 51/009 |
| 2008/0298918 | A1 * | 12/2008 | Brink | B23B 51/02 408/230 |
| 2010/0254779 | A1 * | 10/2010 | Wedner | B23B 51/009 408/224 |

FOREIGN PATENT DOCUMENTS

| | | |
|---|---|---|
| JP | 2008-000836 A | 1/2008 |
| JP | 2009-172708 A | 8/2009 |
| JP | 5945283 B2 | 7/2016 |
| WO | 2017-208939 A1 | 12/2017 |

* cited by examiner

DRILL

TECHNICAL FIELD

The present disclosure relates to a drill.

BACKGROUND ART

As a structural material for the body and wings of an airplane, there has been used a layered body in which a fiber reinforced plastic (FRP) layer, such as a carbon fiber reinforced plastic (CFRP) layer, and a metal layer are layered. In order to perforate this layered body, a drill described in Patent Literature 1 has been utilized. The drill of Patent Literature 1 has a cutting edge at a front end of a main body portion. The cutting edge extends from the center of rotation to an outer periphery and is symmetrical with respect to the center of rotation. This cutting edge is at least constituted of the following three portions: a rotation center portion; an intermediate cutting edge portion continuous to an outer end of the rotation center portion; and an outermost peripheral cutting edge portion having a straight-line shape and continuous to the outer end of the intermediate cutting edge portion. Respective point angles of the cutting edge portions are decreased in stages from the cutting edge portion at the center of rotation side to the cutting edge portion at the outer peripheral side.

CITATION LIST

Patent Literature

PTL 1: Japanese Patent Laying-Open No. 2009-172708

SUMMARY OF INVENTION

A drill according to the present disclosure includes a body having a front end and a back end opposite to the front end. The body includes a first cutting edge, a second cutting edge apart from the first cutting edge to the back end side relative to the first cutting edge, an outer peripheral portion, and a flank face. The outer peripheral portion is provided with: a helical flute extending along a center axis of the body; and a recess that extends in a direction crossing the center axis and that traverses the outer peripheral portion. The center axis of the body extends from the front end to the back end. The recess includes: a first surface continuous to the outer peripheral portion and extending from the outer peripheral portion toward the center axis; and a second surface continuous to the first surface and extending from the first surface toward the front end side of the body. The first cutting edge is constituted of a first ridgeline formed by the flank face and a surface of the helical flute. The second cutting edge is constituted of a second ridgeline formed by the first surface and the surface of the helical flute. In a side view of the body in a first direction in which a distance between the center axis of the body and a first outer end of the first cutting edge is seen the longest, a second outer end of the second cutting edge is located at the center axis side relative to the first outer end of the first cutting edge.

DETAILED DESCRIPTION

Figure 1:
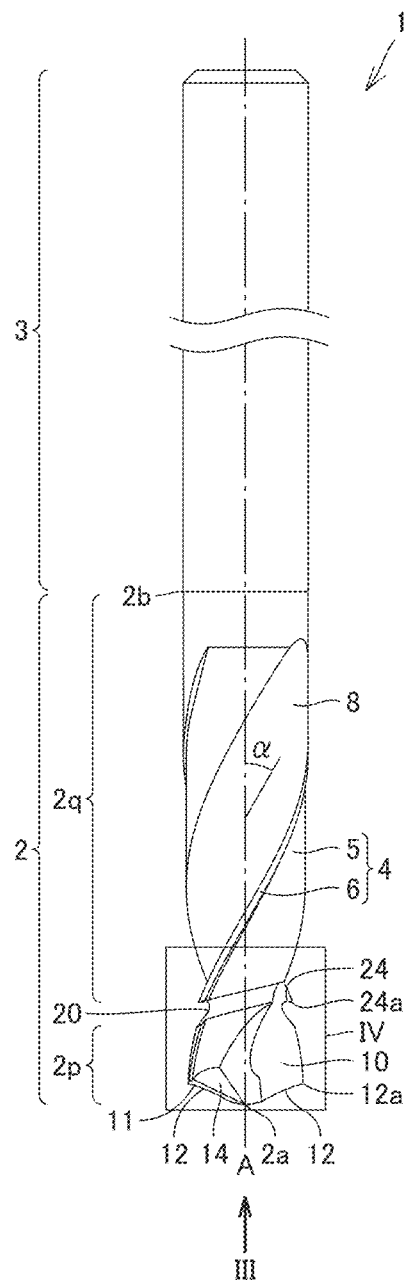
FIG. 1 is a first side view of a drill according to an embodiment when viewed in a first direction.

Problem to be Solved by the Present Disclosure

When perforating the layered body by moving the drill of Patent Literature 1 into the layered body from the FRP layer side toward the metal layer side, ring-shaped swarf may be generated in the metal layer. One embodiment of the present invention has been made to solve the foregoing problem, and has an object to provide a drill that can suppress ring-shaped swarf from being generated in a workpiece when perforating the workpiece.

Advantageous Effect of the Present Disclosure

According to one embodiment of the present invention, ring-shaped swarf can be suppressed from being generated in a workpiece when perforating the workpiece.

Description of Embodiments

First, the following describes a summary of an embodiment of the present invention.

(1) A drill 1 according to the present disclosure includes a body 2 having a front end 2a and a back end 2b opposite to front end 2a. Body 2 includes a first cutting edge 12, a second cutting edge 24 apart from first cutting edge 12 to the back end 2b side relative to first cutting edge 12, an outer peripheral portion 4, and a flank face 11. Outer peripheral portion 4 is provided with: a helical flute 8 extending along a center axis A of body 2; and a recess 20 that extends in a direction crossing center axis A and that traverses outer peripheral portion 4. Center axis A of body 2 extends from front end 2a to back end 2b. Recess 20 includes: a first surface 20a continuous to outer peripheral portion 4 and extending from outer peripheral portion 4 toward center axis A; and a second surface 20b continuous to first surface 20a and extending from the first surface 20a toward the front end 2a side of body 2. First cutting edge 12 is constituted of a first ridgeline formed by flank face 11 and a surface of helical flute 8. Second cutting edge 24 is constituted of a second ridgeline formed by first surface 20a and the surface of helical flute 8. In a side view of body 2 in a first direction in which a distance $L_4$ between center axis A of body 2 and a first outer end 12a of first cutting edge 12 is seen the longest, a second outer end 24a of second cutting edge 24 is located at the center axis A side relative to first outer end 12a of first cutting edge 12.

As such, in drill 1 of the present disclosure, the length of second cutting edge 24 is short to such an extent that second outer end 24a of second cutting edge 24 is located at the center axis A side relative to first outer end 12a of first cutting edge 12 in the side view of body 2 in the first direction. Accordingly, ring-shaped swarf generated when perforating a workpiece by first cutting edge 12 is cut by second cutting edge 24, and is removed from the workpiece. With drill 1 according to the present disclosure, ring-shaped swarf can be suppressed from being generated in the workpiece when perforating the workpiece.

(2) In drill 1 according to (1), in a plan view of front end 2a in a second direction along center axis A, a second distance $r_2$ is longer than a first distance $r_1$ and a third distance $r_3$. First distance $r_1$ is a distance between first outer end 12a of first cutting edge 12 and center axis A in the plan view. Second distance $r_2$ is a distance between second outer end 24a of second cutting edge 24 and center axis A in the plan view. Third distance $r_3$ is a distance between an inner end 24b of second cutting edge 24 and center axis A in the plan view.

When rotating drill 1 around center axis A to perforate the workpiece, the path taken by second cutting edge 24 overlaps with the path taken by first outer end 12a of first cutting edge 12 in the plan view of front end 2a in the second direction along center axis A. Accordingly, ring-shaped swarf generated when perforating a workpiece by first cutting edge 12 is more securely cut by second cutting edge 24, and is more securely removed from the workpiece. With drill 1 according to the present disclosure, ring-shaped swarf can be suppressed from being generated in the workpiece when perforating the workpiece.

(3) In drill 1 according to (2), second surface 20b is recessed toward center axis A. A distance $L_3$ between inner end 24b of second cutting edge 24 and a bottom portion 20c of second surface 20b is more than or equal to 1% and less than or equal to 10% of a drill diameter D. Bottom portion 20c of second surface 20b is a portion of second surface 20b with a minimum distance from center axis A. Drill diameter D is twice as large as second distance $r_2$. Since distance $L_3$ between inner end 24b of second cutting edge 24 and bottom portion 20c of second surface 20b is more than or equal to 1% of drill diameter D, ring-shaped swarf cut by second cutting edge 24 is released via recess 20. The ring-shaped swarf cut by second cutting edge 24 can be prevented from adhering to second cutting edge 24. Ring-shaped swarf can be suppressed from being generated in the workpiece when perforating the workpiece.

Since distance $L_3$ between inner end 24b of second cutting edge 24 and bottom portion 20c of second surface 20b is less than or equal to 10% of drill diameter D, the mechanical strength of drill 1 is prevented from being excessively decreased, whereby drill 1 is less likely to be damaged during processing of the workpiece.

(4) In drill 1 according to any one of (1) to (3), a length $L_2$ of second cutting edge 24 is more than or equal to 0.15 mm and less than or equal to 0.35 mm. Since length $L_2$ of second cutting edge 24 is more than or equal to 0.15 mm, ring-shaped swarf generated when perforating a workpiece by first cutting edge 12 is more securely cut by second cutting edge 24, and is more securely removed from the workpiece. Since length $L_2$ of second cutting edge 24 is less than or equal to 0.35 mm, ring-shaped swarf can be prevented from being generated in the workpiece due to adhesion, to second cutting edge 24, of not only ring-shaped swarf having been already generated by first cutting edge 12 but also swarf of the workpiece newly cut by second cutting edge 24.

(5) In drill 1 according to any one of (1) to (4), a point angle (second point angle θ) of second cutting edge 24 is more than or equal to 1700 and less than or equal to 190°. Since the point angle (second point angle θ) of second cutting edge 24 is more than or equal to 170°, ring-shaped swarf resulting from plastic deformation of the workpiece can be suppressed from being generated. Since the point angle (second point angle θ) of second cutting edge 24 is less than or equal to 190°, second cutting edge 24 is suppressed from being decreased in mechanical strength, whereby second cutting edge 24 can be prevented from being damaged during processing of the workpiece.

(6) In drill 1 according to any one of (1) to (5), a distance $L_1$ between first outer end 12a and second outer end 24a in a direction in which center axis A extends is more than or equal to 1.0 mm and less than or equal to 3.0 mm. Since this distance $L_1$ is less than or equal to 3.0 mm, ring-shaped swarf generated when perforating the workpiece using first cutting edge 12 can be prevented from adhering to second cutting edge 24. Since distance $L_1$ is more than or equal to 1.0 mm, second surface 20b recessed toward center axis A can be formed, thus facilitating removal of the ring-shaped swarf. Moreover, second cutting edge 24 can be readily formed near first cutting edge 12 without excessively decreasing the mechanical strength of front end 2a of body 2.

(7) In drill 1 according to any one of (1) to (6), a helix angle α of helical flute 8 is more than or equal to 200 and less than or equal to 40°.

(8) In drill 1 according to any one of (1) to (7), first cutting edge 12 is a single-angle type.

Details of Embodiments of the Present Disclosure

The following describes an embodiment of the present disclosure with reference to figures. It should be noted that in the below-described figures, the same or corresponding portions in the figures are given the same reference characters and are not described repeatedly.

With reference to FIG. 1 to FIG. 5, a configuration of a drill 1 according to the embodiment will be described. Drill 1 is used to perforate a workpiece, for example.

The workpiece is a layered body in which a fiber reinforced plastic (FRP) layer, such as a carbon fiber reinforced plastic (CFRP) layer or a glass fiber reinforced plastic (GFRP) layer, and a metal layer are layered, for example.

Figure 2:
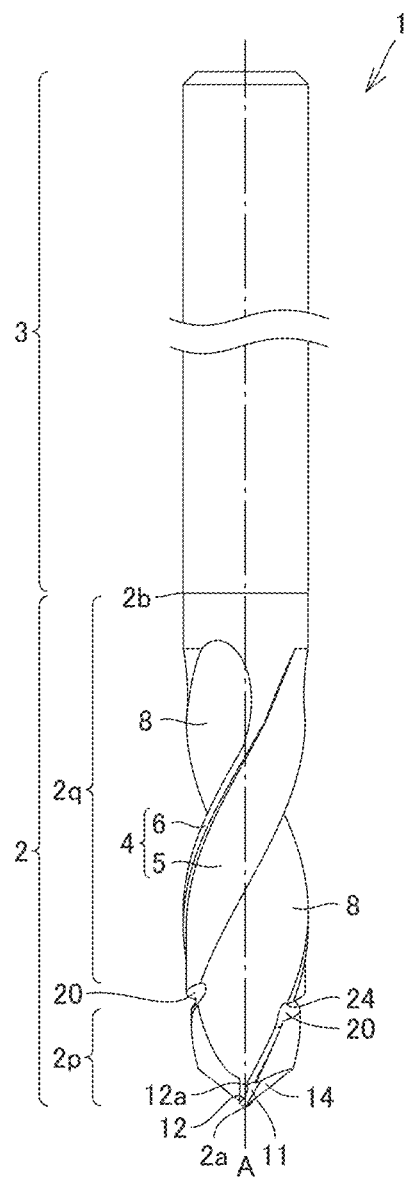
FIG. 2 is a second side view of the drill according to the embodiment when viewed in a direction different from the first direction by 90°.

As shown in FIG. 1 and FIG. 2, drill 1 includes a body 2 and a shank 3. Body 2 includes a front end 2a and a back end 2b opposite to front end 2a. Body 2 is composed of cemented carbide, for example. A diamond coating may be provided on a surface of body 2. Shank 3 is provided on back end 2b of body 2. Shank 3 is a grip to be held by a machine tool during use.

Body 2 has a center axis A. Center axis A is an axis serving as the center of rotation of drill 1. Center axis A of body 2 extends from front end 2a to back end 2b. Body 2 includes an outer peripheral portion 4. Outer peripheral portion 4 includes an outer peripheral surface 5, which is an outer peripheral side surface of body 2. Outer peripheral portion 4 may further include a margin 6. Margin 6 is provided at a leading edge (front edge portion of outer peripheral portion 4 in a rotation direction C of drill 1 (see FIG. 3)) of outer peripheral portion 4, and protrudes from outer peripheral surface 5. Margin 6 forms a space between the workpiece and outer peripheral surface 5 of a first portion 2p during processing of the workpiece so as to prevent outer peripheral surface 5 from coming into contact with the workpiece.

Outer peripheral portion 4 is provided with a helical flute 8 extending along center axis A of body 2. Helical flute 8 is formed to extend from front end 2a to a vicinity of back end 2b. Helical flute 8 is formed in the form of a helix around center axis A. Swarf cut out from the workpiece during processing of the workpiece is released via helical flute 8. A plurality of helical flutes 8 may be formed. A helix angle α of helical flute 8 may be more than or equal to 10°, or may be more than or equal to 20°, for example. Helix angle α of helical flute 8 may be less than or equal to 40°, or may be less than or equal to 30°, for example. As shown in FIG. 1, helix angle α of helical flute 8 is an angle between center axis A and the extending direction of helical flute 8.

Body 2 includes first portion 2p and a second portion 2q, and is provided with a recess 20 between first portion 2p and second portion 2q. First portion 2p includes front end 2a of body 2. Second portion 2q includes back end 2b of body 2. The diameter of second portion 2q becomes gradually larger from the recess 20 side of second portion 2q toward the back end 2b side of second portion 2q. Recess 20 is recessed from outer peripheral portion 4 toward center axis A. Recess 20 is formed by polishing outer peripheral portion 4 using a grindstone, for example.

As shown in FIG. 1 to FIG. 4, first portion 2p includes a first cutting edge 12, a flank face 11, a rake face 10, and outer peripheral portion 4. Helical flute 8 extends also to first portion 2p. First cutting edge 12 is constituted of first ridgelines formed by flank face 11 and the surface of helical flute 8. A portion of the surface of helical flute 8 constitutes rake face 10. First cutting edge 12 includes a first outer end 12a, which is a distal end of first cutting edge 12 relative to center axis A. First cutting edge 12 is a single-angle type. First cutting edge 12 may be a double-angle type including a first cutting edge portion and a second cutting edge portion, which have point angles different from each other. First cutting edge 12 may be a triple-angle type including a first cutting edge portion, a second cutting edge portion, and a third cutting edge portion, which have point angles different from one another.

First portion 2p may further include a back surface 14, front end ridgelines 15, and a thinning portion 17. Back surface 14 is continuous to flank face 11, and is located in a direction opposite to rotation direction C of drill 1 relative to flank face 11. Front end ridgeline 15 is a ridgeline formed by flank face 11 and back surface 14. A first point angle of first portion 2p may be more than or equal to 90°, or may be more than or equal to 110°. The first point angle of first portion 2p may be less than or equal to 160°, or may be less than or equal to 140°. In the present embodiment, the first point angle of first portion 2p is defined as an angle between front end ridgelines 15 in a side view of drill 1 in a direction perpendicular to the extending direction of front end ridgeline 15 and the extending direction of center axis A. Thinning portion 17 serves to decrease cutting resistance of drill 1 during processing of the workpiece.

As shown in FIG. 1 to FIG. 4, recess 20 extends in a direction crossing center axis A. Recess 20 traverses outer peripheral portion 4. Body 2 is narrowed at recess 20, and recess 20 is a narrowed portion of body 2. An angle between center axis A and the extending direction of recess 20 is more than or equal to 80° and less than or equal to 100°, for example. Recess 20 is shallower than helical flute 8. Recess 20 includes: a first surface 20a continuous to outer peripheral portion 4 and extending from outer peripheral portion 4 toward center axis A; and a second surface 20b continuous to first surface 20a and extending from first surface 20a toward the front end 2a side of body 2. First surface 20a may be a flat surface. Second surface 20b may be a curved surface recessed from first surface 20a toward center axis A.

As shown in FIG. 1 to FIG. 4, body 2 includes a second cutting edge 24 apart from first cutting edge 12 to the back end 2b side relative to first cutting edge 12. Second cutting edge 24 is constituted of second ridgelines that are formed by the surface of helical flute 8 and first surface 20a of recess 20 and that are adjacent to the leading edge of outer peripheral portion 4. Second cutting edge 24 includes: a second outer end 24a, which is a distal end of second cutting edge 24 relative to center axis A; and an inner end 24b, which is a proximal edge of second cutting edge 24 relative to center axis A. Second surface 20b is continuous to inner end 24b of second cutting edge 24. Second surface 20b is recessed from inner end 24b of second cutting edge 24 toward center axis A.

Figure 4:
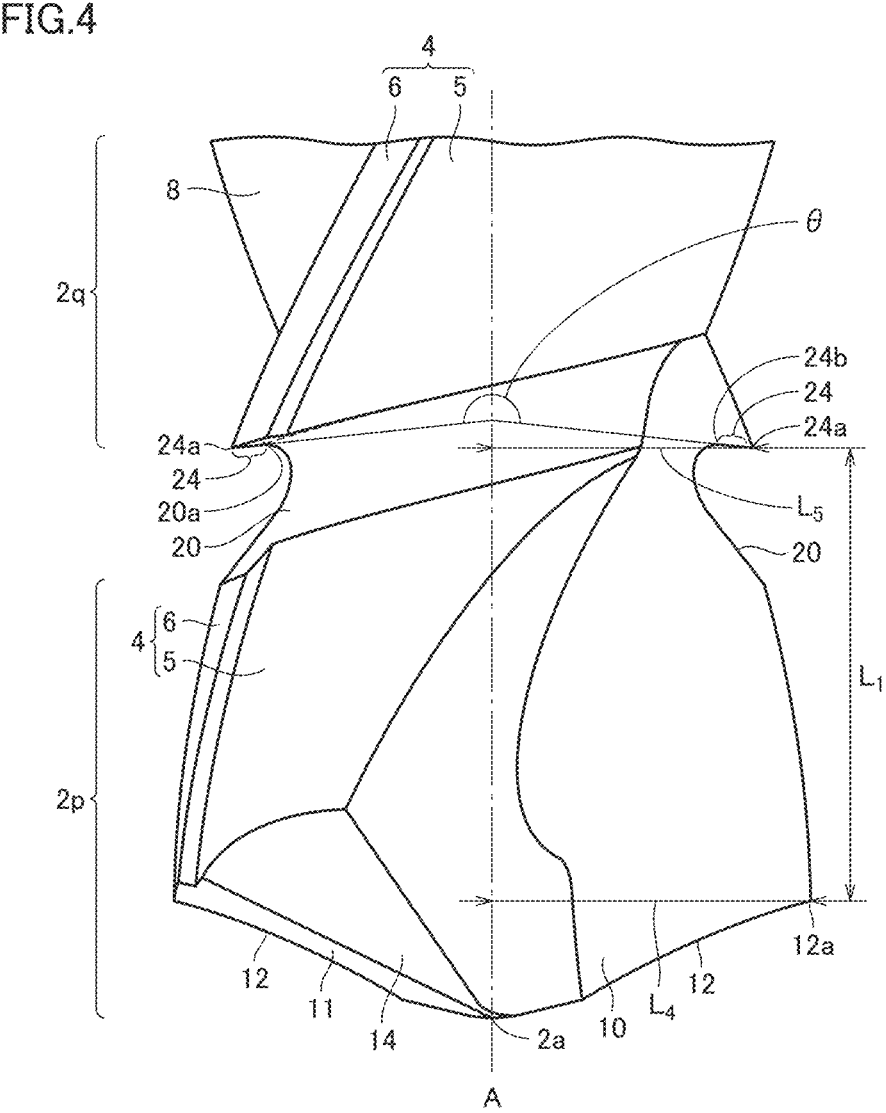
FIG. 4 is a partial enlarged side view of a region TV shown in FIG. 1 in the drill according to the embodiment.

As shown in FIG. 1 and FIG. 4, in a side view of body 2 in a first direction in which a distance $L_4$ between center axis A of body 2 and first outer end 12a of first cutting edge 12 is seen the longest, second outer end 24a of second cutting edge 24 is located at the center axis A side relative to first outer end 12a of first cutting edge 12. In other words, in the side view of body 2 in the first direction, distance $L_5$ between second outer end 24a of second cutting edge 24 and center axis A is smaller than a distance $L_4$ between first outer end 12a of first cutting edge 12 and center axis A.

A length $L_2$ of second cutting edge 24 may be less than or equal to 0.35 mm, or may be less than or equal to 0.25 mm. Length $L_2$ of second cutting edge 24 is defined as a length between second outer end 24a and inner end 24b of second cutting edge 24 Since length $L_2$ of second cutting edge 24 is less than or equal to 0.35 mm, ring-shaped swarf can be prevented from being generated due to adhesion, to second cutting edge 24, of not only ring-shaped swarf having been already generated by first cutting edge 12 but also swarf of the workpiece newly cut by second cutting edge 24. Length $L_2$ of second cutting edge 24 may be more than or equal to 0.15 mm. Since length $L_2$ of second cutting edge 24 is more than or equal to 0.15 mm, ring-shaped swarf generated when perforating the workpiece by first cutting edge 12 is more securely cut by second cutting edge 24, and is more securely removed from the workpiece.

Figure 3:
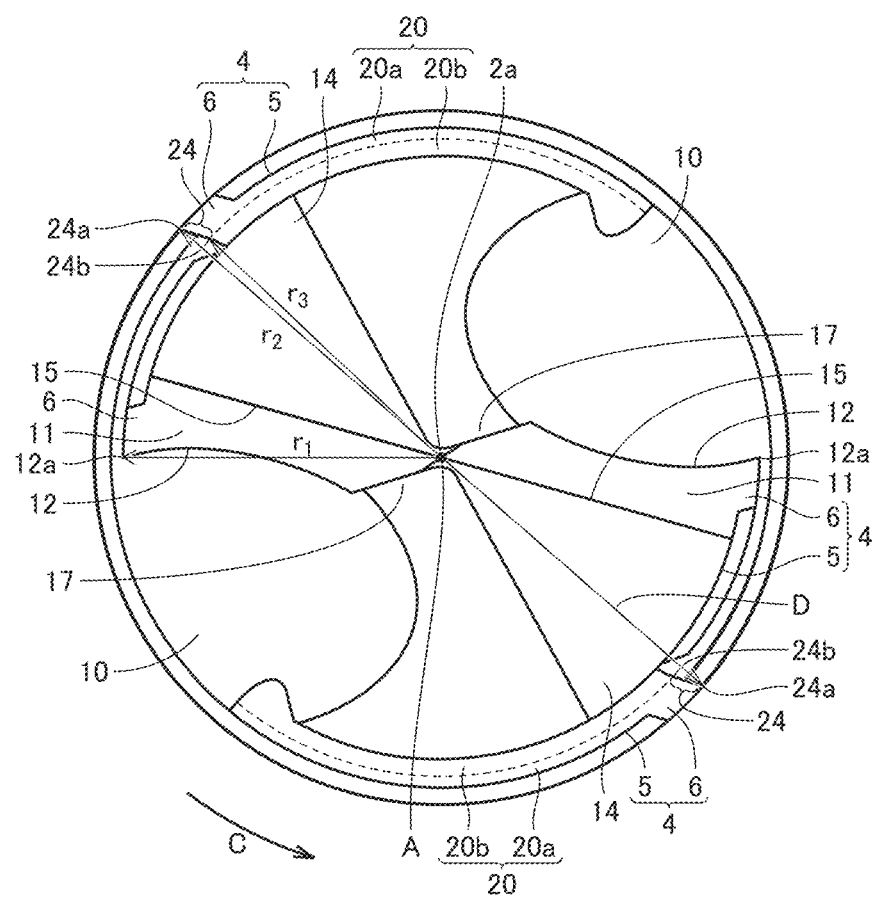
FIG. 3 is a bottom view of the drill according to the embodiment.

As shown in FIG. 3, in a plan view of front end 2a in a second direction along center axis A, a second distance $r_2$ is longer than a first distance $r_1$ and a third distance $r_3$. First distance $r_1$ is a distance between first outer end 12a of first cutting edge 12 and center axis A in the plan view of front end 2a in the second direction along center axis A. Second distance $r_2$ is a distance between second outer end 24a of second cutting edge 24 and center axis A in the plan view of front end 2a in the second direction along center axis A. Third distance $r_3$ is a distance between inner end 24b of second cutting edge 24 and center axis A in the plan view of front end 2a in the second direction along center axis A.

Figure 5:
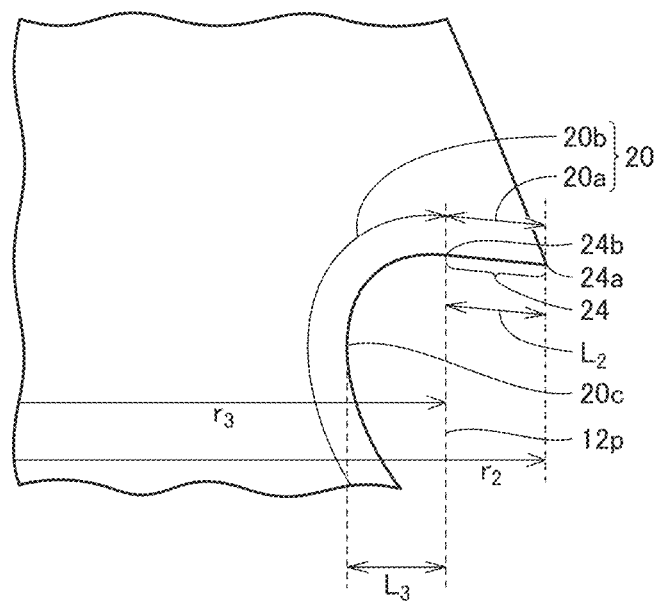
FIG. 5 is a partial enlarged view of the drill according to the embodiment.

As shown in FIG. 3 and FIG. 5, when drill 1 is rotated around center axis A to perforate the workpiece, a path taken by second cutting edge 24 overlaps with a path taken by first outer end 12a of first cutting edge 12 (a line 12p obtained by extending the path taken by first outer end 12a of first cutting edge 12 in parallel with center axis A) in the plan view of front end 2a in the second direction along center axis A. Hence, ring-shaped swarf generated when perforating the workpiece using first cutting edge 12 (for example, ring-shaped swarf generated in the metal layer of the layered body in which the CFRP layer and the metal layer are layered) is securely cut by second cutting edge 24 and is securely removed from the workpiece.

As shown in FIG. 4, a second point angle θ of second cutting edge 24 is more than or equal to 170° and less than or equal to 190°. Since second point angle θ of second cutting edge 24 is more than or equal to 170°, it is possible to suppress generation of ring-shaped swarf resulting from plastic deformation of the workpiece (for example, ring-shaped swarf generated in the metal layer due to plastic deformation of the metal layer in the layered body in which the CFRP layer and the metal layer are layered). Since second point angle θ of second cutting edge 24 is less than or equal to 190°, second cutting edge 24 is suppressed from being decreased in mechanical strength, whereby second cutting edge 24 can be prevented from being damaged during processing of the workpiece.

As shown in FIG. 5, a distance $L_3$ between inner end 24b of second cutting edge 24 and bottom portion 20c of second surface 20b is more than or equal to 1% and less than or equal to 10% of a drill diameter D. Bottom portion 20c of second surface 20b is a portion of the surface of second surface 20b with the minimum distance from center axis A. Distance $L_3$ between inner end 24b of second cutting edge 24 and bottom portion 20c of second surface 20b represents a depth of the recess of second surface 20b.

In the present specification, distance $L_3$ between inner end 24b of second cutting edge 24 and bottom portion 20c of second surface 20b means a distance between inner end 24b of second cutting edge 24 and bottom portion 20c of second surface 20b in a plan view in a third direction. The third direction is a direction in which the distance between inner end 24b of second cutting edge 24 and bottom portion 20c of second surface 20b in the direction from inner end 24b of second cutting edge 24 toward center axis A is seen the longest in the side view of drill 1 (body 2) in the direction in which the distance between inner end 24b of second cutting edge 24 and bottom portion 20c of second surface 20b is seen the longest. As shown in FIG. 3, drill diameter D is twice as large as second distance $r_2$. In the present specification, drill diameter D is a distance between second outer end 24a of one second cutting edge 24 and second outer end 24a of the other second cutting edge 24.

Since distance $L_3$ between inner end 24b of second cutting edge 24 and bottom portion 20c of second surface 20b is more than or equal to 1% of drill diameter D, the ring-shaped swarf cut by second cutting edge 24 is released via recess 20. The ring-shaped swarf cut by second cutting edge 24 can be prevented from adhering to second cutting edge 24. Since distance $L_3$ between inner end 24b of second cutting edge 24 and bottom portion 20c of second surface 20b is less than or equal to 10% of drill diameter D, the mechanical strength of drill 1 is prevented from being excessively decreased, whereby drill 1 is less likely to be damaged readily.

In a ridgeline formed by the surface of helical flute 8 and second surface 20b in the plan view in the third direction, bottom portion 20c of second surface 20b is located at a central region or a region at the inner end 24b side of second cutting edge 24 among three regions obtained by equally dividing this ridgeline into three.

As shown in FIG. 4, a distance $L_1$ between first outer end 12a and second outer end 24a in the direction in which center axis A extends is more than or equal to 1.0 mm and less than or equal to 3.0 mm. Since this distance $L_1$ is less than or equal to 3.0 mm, ring-shaped swarf generated when perforating the workpiece using first cutting edge 12 can be prevented from adhering to second cutting edge 24. Since distance $L_1$ is more than or equal to 1.0 mm, second surface 20b recessed toward center axis A can be formed, thus facilitating removal of the ring-shaped swarf. Moreover, second cutting edge 24 can be readily formed near first cutting edge 12 without excessively decreasing the mechanical strength of first portion 2p of body 2.

EXAMPLES (Preparation of Samples)

Drills of Examples 1 to 5 and a drill of a Comparative Example were prepared. In each of the drills of Examples 1 to 5 and the drill of the Comparative Example, length $L_2$ of second cutting edge 24, second point angle θ of second cutting edge 24, distance $L_1$ between first outer end 12a and second outer end 24a, and helix angle α of helical flute 8 are as being shown in Table 1. In each of the drills of Examples 1 to 5, in the side view of body 2 in the first direction in which distance $L_4$ between center axis A of body 2 and first outer end 12a of first cutting edge 12 is seen the longest, second outer end 24a of second cutting edge 24 is located at the center axis A side relative to first outer end 12a of first cutting edge 12. On the other hand, in the drill of the Comparative Example, in the side view of body 2 in the first direction, second outer end 24a of second cutting edge 24 is opposite to center axis A relative to first outer end 12a of first cutting edge 12. In each of the drills of Examples 1 to 5 and the drill of the Comparative Example, body 2 is composed of cemented carbide and a diamond coating is provided on a surface of body 2. It should be noted that in each of the drills of Examples 1 to 5 and the drill of the Comparative Example, the first point angle is 130° and drill diameter D is 4.8 mm.

TABLE 1

|  | $L_2$ (mm) | θ (°) | $L_1$ (mm) | α (°) | Ring-Shaped Swarf |
|---|---|---|---|---|---|
| Example 1 | 0.2 | 180 | 3.0 | 30 | Not Generated |
| Example 2 | 0.1 | 180 | 2.5 | 40 | Not Generated |
| Example 3 | 0.3 | 150 | 2.0 | 30 | Not Generated |
| Example 4 | 0.2 | 170 | 2.0 | 40 | Not Generated |
| Example 5 | 0.3 | 200 | 3.0 | 30 | Not Generated |
| Comparative Example | 0.4 | 180 | 1.0 | 25 | Generated |

(Evaluation Method)

Each of the drills of Examples 1 to 5 and the drill of the Comparative Example was used to perforate a workpiece. The workpiece is a layered body in which a CFRP plate having a thickness of 5.0 mm and an aluminum plate having a thickness of 5.0 mm are layered. Each of the drills of Examples 1 to 5 and the drill of the Comparative Example was moved into the layered body from the CFRP plate side toward the aluminum plate so as to perforate the layered body, and it was observed whether or not ring-shaped swarf was generated in the metal layer.

(Evaluation Result)

Figure 6:
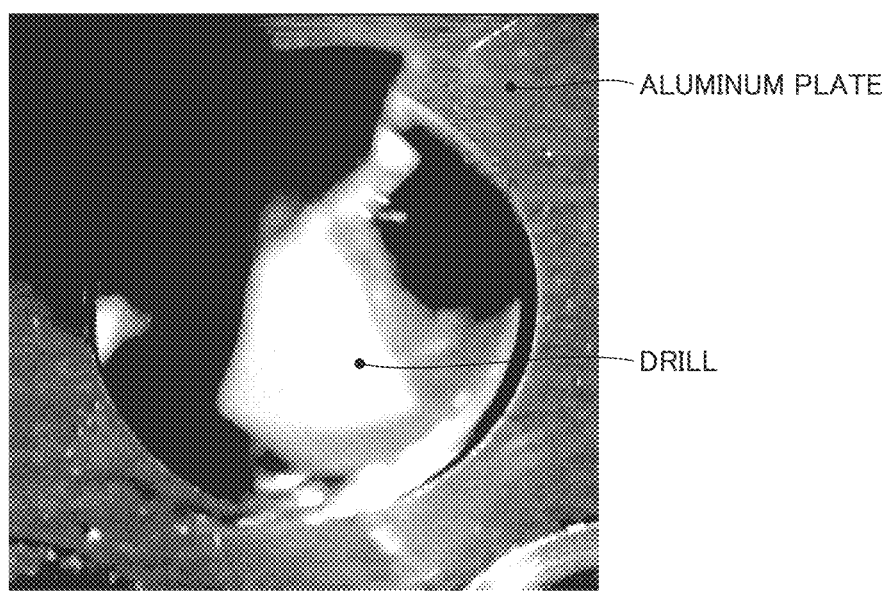
FIG. 6 is a diagram showing a photomicrograph of an opening of a through hole when the through hole is formed in a layered body using a drill of an Example 1.
Figure 7:
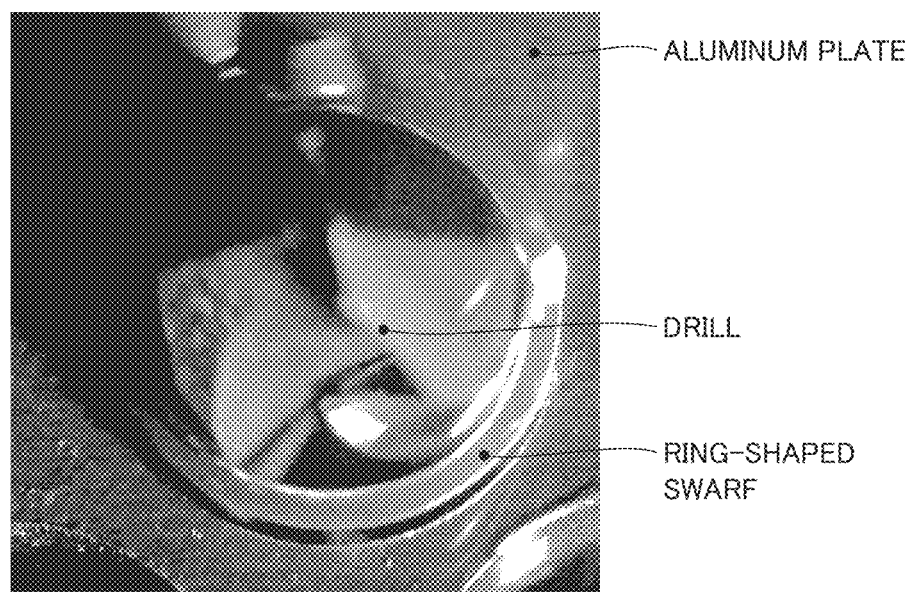
FIG. 7 is a diagram showing a photomicrograph of an opening of a through hole when the through hole is formed in a layered body using a drill of a Comparative Example.

As shown in FIG. 6, when the layered body was perforated using the drill of Example 1, no ring-shaped swarf was generated in the metal layer. Likewise, when the layered body was perforated using each of the drills of Examples 2 to 5, no ring-shaped swarf was generated in the metal layer. On the other hand, as shown in FIG. 7, when the layered body was perforated using the drill of the Comparative Example, ring-shaped swarf was generated in the metal layer.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: drill; 2: body; 2a: front end; 2b; back end, 2p; first portion; 2q; second portion; 3: shank; 4: outer peripheral portion; 5; outer peripheral surface; 6: margin; 8: helical flute; 10: rake face; 11: flank face; 12: first cutting edge; 12a: first outer end; 12p: line obtained by extending a path taken by the first outer end in parallel with the center axis; 14: back surface; 15: front end ridgeline; 17: thinning portion; 20: recess; 20a: first surface; 20b: second surface; 20c: bottom portion; 24: second cutting edge; 24a: second outer end; 24b: inner end; A: center axis; C: rotation direction; D: drill diameter.

The invention claimed is:

1. A drill comprising a body having a front end and a back end opposite to the front end, wherein
the body includes a first cutting edge, a second cutting edge apart from the first cutting edge to the back end relative to the first cutting edge, an outer peripheral portion, and a flank face,
the outer peripheral portion being provided with
a helical flute extending along a center axis of the body, and
a recess extending in a direction crossing the center axis and traversing the outer peripheral portion, the center axis of the body extending from the front end to the back end,
the recess includes
a first surface continuous to the outer peripheral portion and extending from the outer peripheral portion toward the center axis, and
a second surface continuous to the first surface and extending from the first surface toward the front end of the body,
the first cutting edge is constituted of a first ridgeline formed by the flank face and a surface of the helical flute,
the second cutting edge is constituted of a second ridgeline formed by the first surface and the surface of the helical flute,
in a side view of the body in a first direction in which a distance between the center axis of the body and a first outer end of the first cutting edge is seen the longest, a second outer end of the second cutting edge is located closer to the center axis relative to the first outer end of the first cutting edge, and
in the side view of the body in the first direction, the recess is inclined with respect to the center axis and crosses the center axis.

2. The drill according to claim 1, wherein
in a plan view of the front end in a second direction along the center axis, a second distance is longer than a first distance and a third distance,
the first distance is a distance between the first outer end of the first cutting edge and the center axis in the plan view,
the second distance is a distance between the second outer end of the second cutting edge and the center axis in the plan view, and
the third distance is a distance between an inner end of the second cutting edge and the center axis in the plan view.

3. The drill according to claim 2, wherein
the second surface is recessed toward the center axis,
a distance between the inner end of the second cutting edge and a bottom portion of the second surface is more than or equal to 1% and less than or equal to 10% of a drill diameter,
the bottom portion of the second surface is a portion of the second surface with a minimum distance from the center axis, and
the drill diameter is twice as large as the second distance.

4. The drill according to claim 1, wherein a length of the second cutting edge is more than or equal to 0.15 mm and less than or equal to 0.35 mm.

5. The drill according to claim 1, wherein a point angle of the second cutting edge is more than or equal to 170° and less than or equal to 190°.

6. The drill according to claim 1, wherein a distance between the first outer end and the second outer end in a direction in which the center axis extends is more than or equal to 1.0 mm and less than or equal to 3.0 mm.

7. The drill according to claim 1, wherein a helix angle of the helical flute is more than or equal to 20° and less than or equal to 40°.

8. The drill according to claim 1, wherein the first cutting edge is a single-angle type.

* * * * *